United States Patent [19]

Markovitch et al.

[11] Patent Number: 4,641,498
[45] Date of Patent: Feb. 10, 1987

[54] GEOTHERMAL TURBINE

[75] Inventors: Peter Markovitch, Los Angeles; Philip H. Klepesch, La Jolla, both of Calif.

[73] Assignee: Geothermal Energy Development Corporation, La Jolla, Calif.

[21] Appl. No.: 430,406

[22] Filed: Sep. 30, 1982

[51] Int. Cl.[4] ............ F01D 1/36; F03G 7/04
[52] U.S. Cl. ................ 60/641.2; 415/202; 415/203; 415/205
[58] Field of Search ............ 60/641.2, 641.5; 415/202, 203, 205

[56] References Cited

U.S. PATENT DOCUMENTS

| | | | |
|---|---|---|---|
| 104,199 | 6/1870 | Rapp | 415/205 |
| 578,759 | 3/1897 | McElroy | 415/205 |
| 800,485 | 9/1905 | Rhoades | 415/202 |
| 1,124,435 | 1/1915 | Hibner | 415/202 |
| 3,977,818 | 8/1976 | Sprankle | 60/641.2 X |
| 4,063,417 | 12/1977 | Shields | 60/641.5 |
| 4,232,992 | 11/1980 | Possell | 60/641.2 X |

*Primary Examiner*—Allen M. Ostrager
*Attorney, Agent, or Firm*—Brown, Martin, Haller & Meador

[57] ABSTRACT

A geothermal turbine for converting the energy of two-phase geothermal fluids to rotary power includes a housing having a generally cylindrical rotor chamber with a circular manifold, and a plurality of peripheral nozzles for communicating fluid to the rotor chamber, and a rotor mounted coaxially within the chamber incuding a plurality of converging overlapping blades mounted around a central hub and positioned within the rotor for engagement by fluid from the nozzles.

12 Claims, 5 Drawing Figures

GEOTHERMAL TURBINE

BACKGROUND OF THE INVENTION

The present invention relates to turbines and pertains particularly to an improved two-phase fluid turbine for geothermal fluids.

The end of the era of low cost fossil fuels has created a substantial interest in alternate sources of energy. Among these sources of energy yet to be fully developed is that of geothermal energy. Enormous amounts of energy are stored beneath the earth surface in the form of high temperature rocks, molten lava, and other materials including water and steam.

Attempts to develop this source of energy by means of turbines utilizing subterranean sources of steam have met with numerous difficulties. The principal problems with geothermal fluids are the typical multiphase character thereof and the entrapped minerals and particles within the fluids. Conventional steam turbines are impractical as a means of extracting the energy from such geothermal sources.

Attempts to separate the phases of the fluid to utilize only the steam and to remove entrapped particles and dissolved minerals prior to use has been impractical because of the high cost thereof.

It is therefore desirable that a turbine be available which is capable of utilizing two-phase geothermal fluids directly without the necessity of filtering, separating and the like.

SUMMARY AND OBJECT OF THE INVENTION

It is therefore the primary object of the present invention to provide an improved two-phase geothermal turbine.

In accordance with the primary aspect of the present invention, a geothermal turbine includes a housing defining a generally cylindrical turbine or rotor chamber having a curved end and peripheral nozzle inlets with a central axial outlet and containing a rotor having a plurality of radial scroll segment overlapping blades positioned and configured to provide maximum surface contact with multiphase geothermal fluid for utilizing boundary layer drag for extracting the kinetic energy of the fluid and converting it to a rotary power.

BRIEF DESCRIPTION OF THE DRAWINGS

The above and other objects and advantages of the present invention will become apparent from the following description when read in conjunction with the drawings wherein.

DETAILED DESCRIPTION OF PREFERRED EMBODIMENTS

Figure 1:
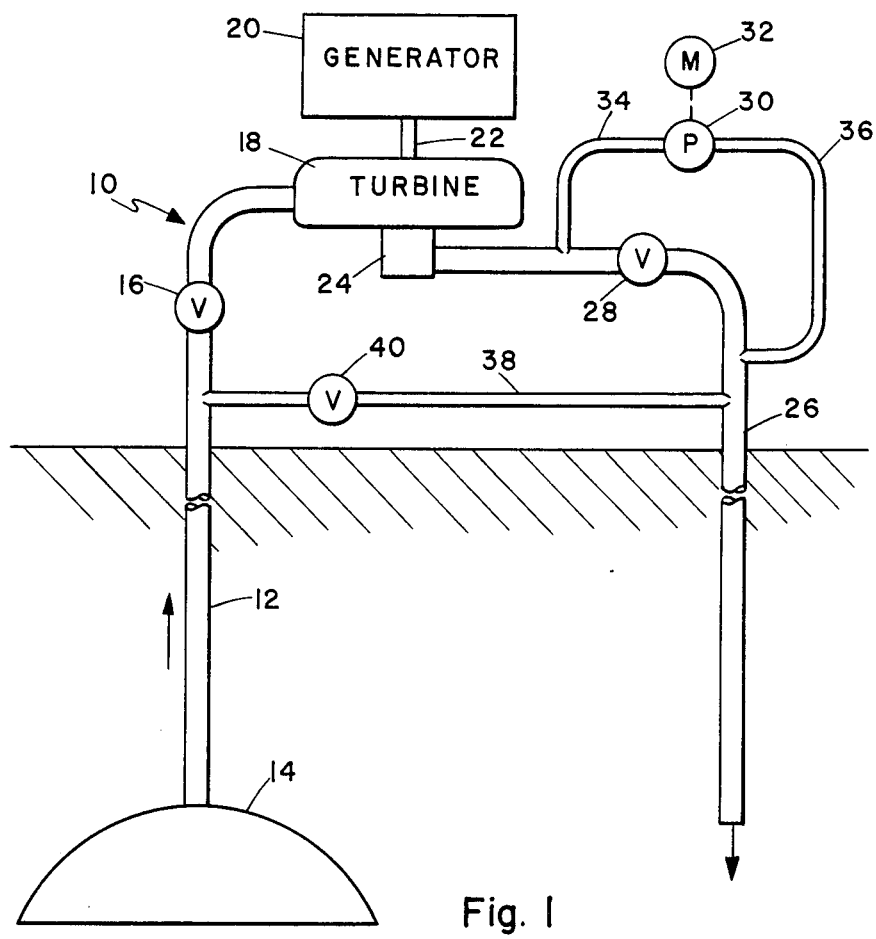
FIG. 1 illustrates schematically a typical geothermal turbine installation.

Turning to the drawings, FIG. 1 schematically illustrates a typical geothermal turbine installation designated generally by the numeral 10. The installation includes a geothermal well including piping or casing 12 tapping or communicating with a geothermal collection dome 14 for conveying geothermal fluids which typically include a two-phase combination of steam and water to the surface for utilization in a turbine as illustrated. The pipe or conduit 12 includes a suitable control valve 16 and communicates to a turbine 18 for driving an electrical generator 20 by a shaft 22. The fluids pass through the turbine and the energy is extracted therefrom by way of the turbine and converted to rotary power which is utilized to drive the generator 20. The spent fluid is collected and an effluent collector 24 where it is by means of a discharge tube or pipe 26 back to the earth formation by means of a second or return well. A valve 28 in the line 26 is utilized to control the flow therein. A booster pump 30 driven by motor 32 and connected to the pipe 26 by means of bypass or booster conduits 34 and 36 may be used to apply sufficient pressure to the effluent to return it to the earth formation. A bypass line 38 controlled by valve 40 may be utilized to bypass the turbine when necessary or partially bleed off the fluids as desired.

The formation itself may supply sufficient water and/or steam to satisfy the requirements requiring only a drilling of a well and tapping into the source of the water or steam. In other instances it may be necessary to pump a source of water to the formation to be heated and returned to the turbine generating system. In any event, the present invention contemplates the utilization of two-phase fluids, such as would be obtained primarily from geothermal sources wherein the fluids also may contain dissolved mineral salts and/or other solid particles.

Turning to FIGS. 2 through 5, a preferred embodiment of a turbine embodying the principals of the present invention is illustrated in substantial detail. The turbine includes a housing 42 having a somewhat, or generally flat circular configuration, however with the upper end 44 viewed in FIG. 4 having a curved configuration extending outwardly and curving from the outer diameter radially inward toward the axis and then extending a curving back axially, inwardly to the central axis. A substantially flat circular lower wall 46 connected to the substantially cylindrical side walls 48 complete the basic housing structure.

The housing forms a central rotor chamber 50 having a configuration substantially identical to that described for the housing. This chamber has a substantially flat bottom wall and an axially downwardly curved upper wall to the center axis.

A manifold 52 of a circular configuration surrounds the circumference or outer diameter of the housing and includes an inlet line 54 and a plurality of nozzles 56 communicating from the manifold 52 into the vane chamber, preferably at an angle somewhere on the order of about 35°. This angle can vary within limits not yet established. However, the angle of about 35° is found to be preferred angle for the illustrated embodiment.

It will be appreciated that both steam and/or water may be injected through the nozzles 56 which for purposes herein are schematically illustrated. It will be understood that specific configurations for the nozzles may be developed and may have critical significance.

Figure 4:
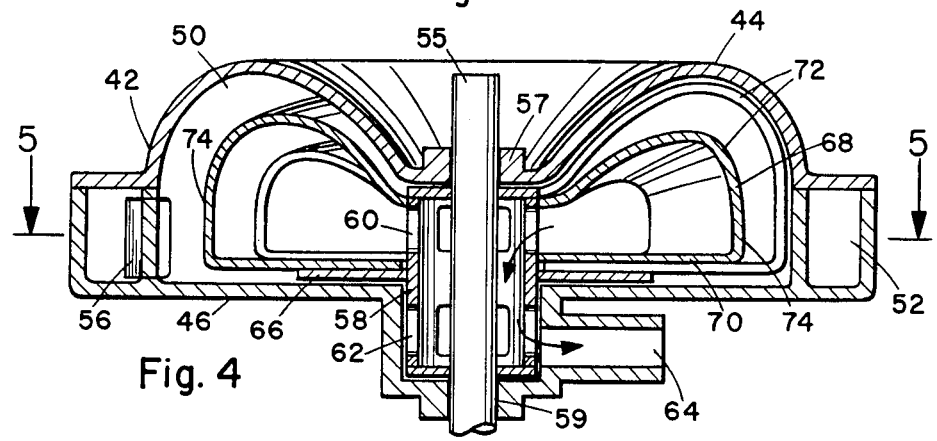
FIG. 4 is an enlarge sectional view taken on line 4—4 of FIG. 2.

Referring to FIG. 4, a rotor is mounted within the chamber and supported therein on a drive shaft 55 which, in turn, is mounted for rotation within conventional bearings 57 and 59 within the turbine housing.

Figure 3:
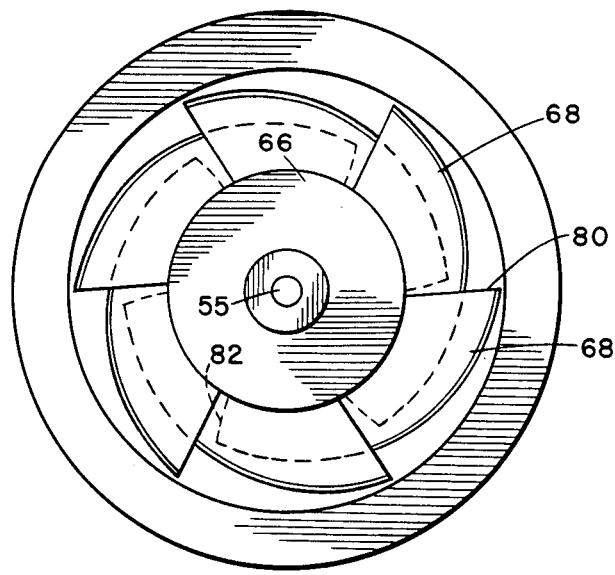
FIG. 3 is an underside view of the turbine unit with the lower housing removed.
Figure 5:
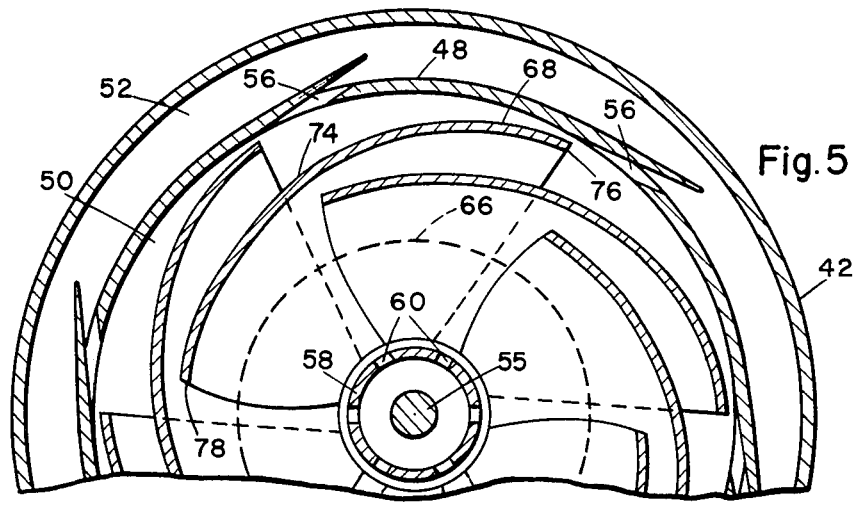
FIG. 5 is a sectional view taken on line 5—5 of FIG. 4.

The rotor includes a central cylindrical core structure 58 secured in a suitable manner directly to the drive shaft 55. The central core 58 defines a central annular fluid outlet or exit passage including inlet ports 60 communicating fluid from the vane chamber along the passage to outlet ports 62 which in turn communication with an outlet port or conduit 64. A radial flange 66 extends outward from the axial center of the central core 58 for mounting and supporting one side of a plurality of identical turbine blades 68. The turbine blades are identical in construction and in the illustrated embodiment consists of six in number, each forming a segment of substantially 90° thereby overlapping each adjacent blade as best seen in FIGS. 3 and 5. These blades may be variously described as a segment of a spiral evolute or a scroll as these terms may be broadly defined. Each blade comprises a segment of a geometric figure which is hollow forming an internal channel and progressively and continuously without steps decreases in radius and in axial width with the direction of rotation about the axis.

Referring first to FIG. 4, it will be seen that each blade includes a generally flat bottom wall 70 with a curved upper wall 72 joined at their outer peripheries with a generally straight peripheral wall 74 that progressively decreases in radial position from the central axis from a trailing edge or tip 76 thereof to a leading edge or tip 78. The bottom side 70 as seen in FIGS. 3 and 5 terminates in a straight forward edge 80 with a similarly shaped trailing edge 82.

As will also be appreciated from FIGS. 3 and 5, each blade has an enlarged front end converging downward both in radius and width to a small trailing end that is viewed from the nozzle intercepting end of the blade with the small front edge extending into the enlarged trailing end of a preceding or adjacent blade forming a peripheral flow channel from the exterior of the rotor to the interior thereof. As will be also appreciated from viewing, particularly FIGS. 2 and 5, the angle of the blades at the outer end and along the surface is such that only a small frontal area is presented to the respective nozzles resulting in flow from the nozzles passing along the exterior and interior surfaces of the respective vanes. This, as will be appreciated from the following discussions results in a transfer of energy from the fluid to the fluid and then to the rotor vanes by way of boundary layer drag or friction between the fluid and the adjacent blade.

Figure 2:
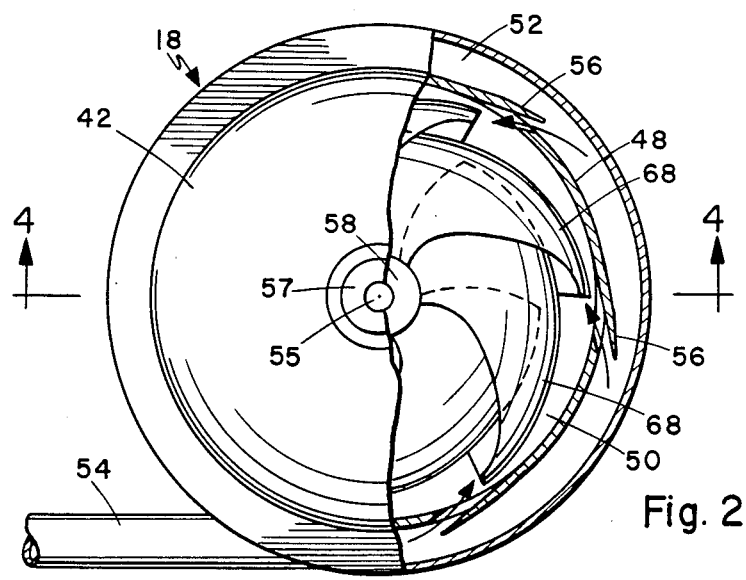
FIG. 2 is an enlarged top plan view of the turbine unit with portions cut away.

Turning to FIG. 2, the curved edge or end 72 of each respective blade is formed with a curved forward edge spiralling downward from the outer rear tip 76 inward to the central or rotary axis of the rotor. This together with the upper wall curvature directs the fluid inward and slightly axially downward along the axis of the rotor.

While the rotor has been illustrated, described with the axis being vertically oriented with certain walls being upper and certain being lower, it should be understood that the turbine will function in a horizontal axis position with the axis positioned horizontally. The particular configuration, however, has been designed to provide a preferential flow of the discharge fluids downward through the passage in the rotor along the axis to the discharge port 64.

In operation, a pressurized fluid such as a geothermal fluid having a mixture of water and steam, is introduced into the turbine via the inlet port 54 into the manifold 52 passing from the manifold by way of nozzles 56 into the rotor chamber engaging the trailing tip or edge of the rotor blades as it passes into the rotor chamber. Some of the liquid in the fluid will flash to steam as it passes from the nozzles increasing the steam and expanding gasses in the chamber. A certain amount of the fluid (i.e., water) will accumulate in and swirl around as a body within the chamber. The body of fluid will form a vortex, contacting and engaging the vanes and carrying them along within the chamber. The combination of the rotor chamber and the blades together with the flowing fluid, creates a vortex with the fluid flowing inward to the center low pressure vortex area of the rotating fluid. The fluid flowing along, or attempting to pass along, the surfaces of the blades of the turbine transfers the kinetic energy thereof directly to the blades by means of a boundary layer drag and as its energy is dissipated it moves downward and toward the low pressure center or vortex in the chamber. The fluid as its energy dissipates flows into the central passageway in the rotor by way of ports 60 and out port 62 through the discharge port 64 and returns to the reinjection well.

Thus, while we have illustrated and described our invention by means of specific embodiments, it is to be understood that numerous changes and modification may be made therein without departing from the spirit and scope of the invention as defined in the appended claims.

What is claimed is:

1. A two-phase fluid turbine comprising:
   a housing having a generally cylindrical rotor chamber;
   a plurality of nozzles for communicating fluid to said chamber at spaced points around the periphery of said chamber;
   a manifold for communicating pressurized fluid from a source to said nozzles; and
   a rotor mounted coaxially within said rotor chamber and including a plurality of radially converging blades mounted around a central hub, each blade overlapping the next adjacent blade by a sufficient amount to form converging flow guiding channels between the opposing overlapping faces of adjacent blades for directing flow from the exterior to the interior of the rotor, each blade having a radially outward tip positioned for interruption of fluid from said nozzles; said blades defining spiral evolute segments diminishing in radius and width in the direction of rotation.

2. The fluid turbine of claim 1 wherein each blade overlaps up to about one-half the area of an adjacent vane.

3. The fluid turbine of claim 2 wherein each blade forms a segment covering about one-quarter of a circle.

4. The fluid turbine of claim 3 wherein the crosssectional configuration of each of said blades is substantially the same as said housing.

5. The fluid turbine of claim 4 wherein said rotor includes an outlet passage extending concentrically along the axis thereof.

6. The fluid turbine of claim 5 wherein said inlet nozzles are directed at an angle of about 35° to the tangent to the housing at the outer diameter thereof.

7. The turbine of claim 6 wherein said housing is shaped to define a flat end wall and a curved end wall of said rotor chamber.

8. The turbine of claim 1, wherein said blades each comprise an outer peripheral wall and spaced upper and lower walls extending from the outer peripheral wall to the central hub, the lower wall being flat and the upper wall being curved, each blade having a straight forward edge on the lower wall and a scroll-shaped forward edge on said curved upper wall, said outer peripheral wall decreasing in radius from its forward end to its rearward end.

9. A fluid power system comprising:
a source of geothermal fluid;
a two-phase fluid turbine for converting kinetic energy of said geothermal fluid to a rotating motion of a drive shaft; said turbine including blades having a segmented spiral evolute configuration overlapping adjacent blades forming converging fluid channels there between for thereby defining a boundary layer turbine; said turbine comprising a generally flat cylindrical housing oriented on a vertical rotary axis and including a coaxial fluid outlet.

10. The geothermal power generating system of claim 9 wherein said housing includes a circumferential manifold and a plurality of nozzles communicating from said manifold into the rotor chamber of said housing at an angle to a tangent to the housing.

11. The geothermal power generating system of claim 10 wherein the angle of the rotor blade surfaces and the angle of the nozzles are substantially equal.

12. The geothermal power system of claim 11 wherein said turbine blades and said nozzles are equal in number.

* * * * *